United States Patent Office 2,694,692
Patented Nov. 16, 1954

2,694,692

METHOD OF MAKING LINEAR INTERPOLYMERS OF MONOVINYL AROMATIC COMPOUNDS AND A NATURAL OR SYNTHETIC RUBBER

James L. Amos, John Lloyd McCurdy, and Otis Ray McIntire, Midland, Mich., assignors to The Dow Chemical Company, Midland, Mich., a corporation of Delaware No Drawing. Application August 25, 1950,
Serial No. 181,576

6 Claims. (Cl. 260—45.5)

This invention concerns an improved method of interpolymerizing monovinyl aromatic compounds with natural or snythetic rubber. It relates more particularly to the production of homogeneous thermoplastic compositions which are substantially linear interpolymers of natural or a synthetic rubber rubber with a polymerizable monovinyl aromatic compound having the vinyl radical directly attached to a carbon atom of the aromatic nucleus, e. g. styrene.

It is known to dissolve an unvulcanized natural rubber in monomeric styrene and thereafter heat the mixture to a polymerization temperature. It was previously thought that the product was a composition consisting of an intimate mixture of the rubber and polystyrene. Actually, the styrene interpolymerizes with the rubber to form a true copolymer. However, in preparing such copolymers by polymerization of the mixture in bulk, i. e. in the substantial absence of inert liquid media, the rubber which is dissolved or intimately dispersed in the monomeric styrene, interpolymerizes therewith and tends to form cross-linked or highly branched-chain interpolymers which are less soluble in the polymerizing mixture than is the rubber. The formation of such cross-linked or highly branched-chain interpolymers in the polymerizing mixture, results in the formation of non-uniform polymeric products which are insoluble in aromatic hydrocarbons, e. g. toluene. Also, the formation of such insoluble polymeric products during polymerizing, frequently causes separation of the polymerizing mixture into two phases, or may result in gelling of the polymerizing mixture, prior to the polymerization being completed. Although, such non-uniform interpolymer products of styrene and rubber can usually be brought to a state of homogeneity, or rendered soluble in toluene, by mechanically working or compounding the mass on a rubber mill, or on heated compounding rolls, such procedure is time-consuming and costly and the polymeric products thus processed are less suitable for many purposes, e. g. for extrusion or injection molding operations, than is desired, because of excessive molecular breakdown during the milling operation.

We have now discovered that homogeneous substantially linear interpolymers of a polymerizable monovinyl aromatic compound having the vinyl radical directly attached to a carbon atom of the aromatic nucleus, e. g. styrene, with an unvulcanized and unsaturated natural or synthetic rubber such as natural pale crepe rubber, synthetic GRS type rubber (copolymers of butadiene and styrene), synthetic Buna N type rubber (copolymers of butadiene and acrylonitrile), or homopolymers of butadiene-1,3, or isoprene, which rubber is soluble in, or can be rendered soluble in, monomeric styrene, e. g. by milling the rubber on compounding rolls, can readily be obtained by procedure which involves dissolving or intimately mixing an unvulcanized natural or synthetic rubber in a monomeric polymerizable monovinyl aromatic compound, so as to obtain a solution or mixture substantially free of insoluble gels, heating the solution to a polymerization temperature, agitating the solution during polymerization so as to obtain a shearing action throughout its mass until at least 10, preferably from 15 to 40 per cent by weight of the starting materials are polymerized and thereafter continuing heating of the mass with or without agitating the same to polymerize the remaining monomers or until the polymerization is substantially complete.

It is important that the solution of the rubber and the polymerizable monovinyl aromatic compound, e. g. styrene, be agitated, preferably with a shearing action throughout its mass, during the early stages, or first part, of the polymerization reaction in order to obtain homogeneous linear interpolymerization products which are free, or substantially free, of cross-linked or highly branched-chain interpolymer molecules.

The rubber, apparently because of its relatively high degree of unsaturation or the number of olefinic bonds in the rubber molecule, interpolymerizes with a monomeric polymerizable monovinyl aromatic compound such as styrene or ar-methylstyrene, to form interpolymers which contain both styrene nuclei and rubber molecules chemically combined in the same polymer chain or interpolymer molecule. These interpolymer molcecules or chains appear to further interpolymerize or chemically combine with other molecules of styrene, or rubber, and also with each other, and form cross-linked or highly branched-chain interpolymer molecules which are insoluble in the polymerizing solution. This results in the formation of gel particles or agglomerates of the cross-linked interpolymer molecules, or chains, which appear as imperfections or blemishes visible to the naked eye, particularly when the finished polymer or product is molded or extruded by usual injection or compression molding operations. Such highly cross-linked interpolymers are insoluble in toluene.

The tendency toward the formation of cross-linked interpolymers appears to be greatest during the early part of the polymerization, e. g. when 10 per cent by weight or less of the starting materials have been polymerized. During this stage of the polymerization, the interpolymer molecules appear to be attached to each other, or held together by relatively weak forces, i. e. the cross-linked interpolymers or highly branched-chain polymers are apparently agglomerates of polymer molecules which are held together by only a few or by relatively weak bonds. Regardless of the theory concerning the formation of the cross-linked interpolymers, it has been found that the tendency toward the formation of such cross-linked interpolymer molecules, which cause inhomogeneities in the polymeric product, can be prevented or substantially reduced by application of a shearing action to the polymerizing mass, i. e. by agitating the polymerizing mass, particularly during the early or first stages of the polymerization. The agglomerates of polymer molecules which are loosely bonded or cross-linked together, as well as the polymer chains, are readily broken up or torn apart to form interpolymer molecules of shorter chain length or polymers having a lower average molecular weight, by application of mechanical agitation in the form of a shearing action throughout the mass of the polymerizing mixture. It may be mentioned that vigorous or strong agitation appears to produce linear interpolymers of low viscosity while less violent agitation permits the formation of long polymer chains and high viscosity, and, if the agitation is extremely mild, may result in cross-linking and gelling of the polymerizing mixture prior to the polymerization being completed.

The agitation to be employed in the process should be applied at short intervals, or preferably in continuous manner, and must be vigorous enough so as to prevent or substantially reduce the tendency toward the formation of cross-linked or highly branched-chain interpolymer molecules in the polymerizing mixture. The polymerizing mixture is mechanically agitated by application of a stirring or shearing action throughout its mass such that a sample of the polymerizing mixture when withdrawn and mixed with twenty times its weight of an organic solvent, e. g. benzene or toluene, having a refractive index different from that of the polymer, forms a clear solution free of any polymer particles or gels visible to the naked eye or capable of being filtered from the solution by "Whatman" No. 42 analytical grade filter paper.

The degree of mechanical agitation to be employed will, of course, vary widely depending upon the size and shape of the polymerizing vessel and also upon the type of agitating device, e. g. the design and pitch of the propeller paddles or blades, used to stir the mixture. Agitation may also be carried out by means other than stirring, e. g. by tumbling, shaking or rocking. Such agitation may be made equivalent to stirring by changing the rate or degree of shaking.

Styrene is the preferred monovinyl aromatic compound, but other polymerizable monovinyl aromatic compounds such as ortho-methylstyrene, meta-methylstyrene, para-methylstyrene, meta-ethylstyrene, para-ethylstyrene, para-isopropylstyrene, ortho-chlorostyrene, para-chlorostyrene, ortho,para-dimethylstyrene and ortho, para-diethylstyrene or mixtures of any two or more of such compounds may be used. Mixtures of such monomeric polymerizable monovinyl aromatic compounds, together with monomeric vinyl and vinylidene compounds which mixtures of polymerizable olefinic compounds consist of 75 per cent by weight or more, of a monovinyl aromatic compound, e. g. styrene or ar-methylstyrene, and 25 per cent or less of a vinyl or vinylidene compound such as acrylonitrile, methyl isopropenyl ketone, alpha-methyl styrene, methyl-alpha-methyl styrene, ar-dimethyl-alpha-methyl styrene, ethyl-alpha-methyl styrene, isopropyl-alpha-methyl styrene, ar-chloro-alpha-methyl styrene, ar-dichloro-alpha-methyl styrene, or ar-chloro-ar-methyl-alpha-methyl styrene, may also be used. The term "monovinyl aromatic compound" pertains to the polymerizable monovinyl aromatic compounds having the vinyl radical directly attached to a carbon atom of the aromatic nucleus, just mentioned, and mixtures of any two or more of such monovinyl aromatic compounds.

Any unvulcanized natural or synthetic rubber which is soluble in monomeric styrene, or can be rendered soluble in styrene, e. g. by milling on compounding rolls, and contains at least one free olefinic linkage per two basic units in the rubber polymer molecule, may be used. By basic unit is meant the radical making up the rubber molecule, which in the case of natural rubber is the isoprene radical $(C_5H_8)_n$ having in its combined form one olefinic linkage per isoprene radical. In the case of synthetic GRS type rubber, the basic unit is the radical corresponding to the conjugated olefine, e. g. butadiene, chemically combined in the rubber molecule.

This synthetic rubber preferably has a degree of unsaturation coresponding to at least 50 per cent of that of natural rubber. The rubber to be employed should have a Mooney viscosity of not more than 120, preferably a Mooney viscosity of from 20 to 80. Examples of suitable rubbers are unvulcanized natural rubber, synthetic GRS type rubbers which are copolymers of from 20 to 50 per cent by weight of styrene and from 50 to 80 per cent by weight of butadiene, synthetic Buna N type rubber such as Hycar OR–15, Perbunan NS–18, or Hycar OR–25, which are copolymers of from 75 to 85 per cent by weight of butadiene and from 15 to 25 per cent of acrylonitrile, copolymers of 50 per cent by weight of butadiene and 50 per cent methyl isopropenyl ketone, and homopolymers of butadiene or isoprene. Mixtures of any two or more of such rubbers may also be used. Specific GRS type synthetic rubbers which are suitable are standard GRS, a copolymer of 76.5 per cent by weight of butadiene and 23.5 per cent of styrene, having a Mooney viscosity of from 45–54, GRS–X274 a copolymer of 76.5 per cent of butadiene and 23.5 per cent of styrene, having a Mooney viscosity of from 60–70, GRS–40 a copolymer of 50 per cent of butadiene and 50 per cent of styrene, having a Mooney viscosity of from 40–50, GRS–X178 a copolymer of 71 per cent of butadiene and 29 per cent of styrene, having a Mooney viscosity of from 45–55, GRS–X245 a copolymer of 58 per cent of butadiene and 42 per cent of styrene having a Mooney viscosity of from 45–55, and GRS–85 a copolymer of 76.5 per cent of butadiene and 23.5 per cent of styrene, having a Mooney viscosity of from 90–110.

The monovinyl aromatic compound, e. g. styrene, and the natural or synthetic rubber may be employed in amounts corresponding to from one to 15 per cent by weight of the rubber, and from 99 to 85 per cent of the monovinyl aromatic compound, based on the combined weight of the rubber and the polymerizable monomeric starting materials, but an amount of the natural or synthetic rubber corresponding to from 5 to 10 per cent by weight of the combined weight of the monomeric polymerizable starting materials and the rubber is preferably employed.

Polymerization of the solution is usually carried out at temperatures between 60° and 200° C., preferably at temperatures between 60° and 150° C. and at atmospheric or substantially atmospheric pressure, although superatmospheric pressures may be used. The polymerization is preferably carried out under a pressure sufficient to prevent loss of monomer from the polymerizing mixture at the temperature employed.

The process is carried out by polymerizing the starting materials while agitating the polymerizable solution by application of a shearing action throughout its mass and heating of the same to polymerization temperatures between 60° and 150° C., preferably a temperature of from 70° to 90° C., until a solution contaiinng from 10 to 40 per cent by weight of polymer is obtained. Thereafter, the polymerization is usually continued at temperatures of from 90° to 200° C., with or without agitating the polymerizing mass until all or nearly all of the remaining monomer is polymerized. Such further polymerization may be carried out by sealing the pre-polymerized solution in a closed vessel and heating the same in bulk to polymerization temperatures between 90° and 200° C. without further agitation. The pre-polymerized solution may be agitated during polymerization until all or nearly all of the remaining monomer is polymerized, in which case the temperature of the polymerizing mass is progressively increased during the polymerization so as to maintain the mass in a heat-plastified or flowable condition as the proportion of polymer increases. Such latter method may readily be carried out by passing the polymerizing mass through one or more heated polymerization zones such as a plastics extruder, wherein it is agitated and maintained at a polymerization temperature for a period of time sufficient to polymerize or substantially polymerize the remaining monomer, e. g. until from 90 to 95 per cent by weight or more of the monomer is polymerized, and thereafter separating the volatile components from the polymeric product. The process may also be carried out to obtain polymeric products containing the rubber chemically combined with the monovinyl aromatic compound by heating the solution of starting materials, e. g. a solution of natural rubber in styrene, to a polymerization temperature, during agitating, until from 10 to 40 per cent by weight of the materials are polymerized and thereafter separating volatile ingredients together with unreacted monomer from the polymeric product.

The polymerizing reaction may advantageously be carried out in the presence of a small amount, e. g. from 0.001 to 1 per cent by weight of a polymerization catalyst such as benzoyl peroxide, lauroyl peroxide, or di-tertiarybutyl peroxide, but a catalyst is not necessary. Small amounts of lubricants or flow agents such as butyl stearate, or soybean oil, may also be incorporated in the polymerizable solutions. Polymerization modifiers such as lauryl mercaptan, di-isopropyl xanthate, or methallyl phosphate may also be added to the polymerizable solutions.

In practice, the polymerizable monovinyl aromatic compound, e. g. styrene, and the natural or synthetic rubber are mixed together in the desired proportions and the mixture is stirred and maintained at room temperature or thereabout to dissolve the rubber in the monomeric polymerizable monovinyl aromatic compound. The solution is usually filtered to remove any insoluble gels of the rubber, together with any foreign substances, so as to obtain a homogeneous solution of the rubber and the polymerizable monovinyl aromatic compound. The solution is placed in a suitable vessel provided with an agitating device such as a propeller type agitator, or a similar device having blades or paddles, and means for heating or cooling the vessel as required. The solution is agitated and is heated to a polymerization temperature within the range of from 60° to 150° C., preferably a temperature of from 70° to 90° C. During polymerization, agitation of the mixture is continued by application of a shearing force of the body of the polymerizing solution or mass sufficiently vigorous to prevent or substantially reduce the tendency toward the formation of insoluble gels or highly cross-linked interpolymer molecules, until from 10 to 40 per cent by weight of the starting materials are polymerized. Thereafter, the prepolymerized solution is heated in bulk with or without agitation until all or nearly all of the monomer is polymerized.

The process may advantageously be carried out in continuous manner by feeding a solution of the rubber and the monomeric polymerizable monovinyl aromatic compound into a vessel where it is agitated and heated under polymerizing conditions at temperatures between 60° and 150° C., withdrawing from the vessel a partially polymerized solution containing from 10 to 40 per cent by weight of polymer, at a rate corresponding to about the rate of feed of the rubber solution to the vessel, feeding the partially polymerized solution into a continuous polymerizer, e. g. a plastics polymerizer and extruder, wherein the polymerization is continued while agitating until it is substantially complete, or until nearly all of the polymerizable starting materials are polymerized, discharging the polymeric product through an extrusion orifice and separating volatile components from the polymeric product, e. g. by heating in vacuum.

The following examples illustrates ways in which the principle of the invention has been applied, but are not to be construed as limiting the invention.

EXAMPLE 1

A mixture consisting of 1900 grams of monomeric styrene and 100 grams of unvulcanized synthetic GRS type X274 rubber, a copolymer of approximately 76.5 per cent by weight of butadiene and 23.5 per cent of styrene, having a Mooney viscosity of from 60–70, was agitated at room temperature over a period of 16 hours. The resulting solution was filtered to remove insoluble substances. A charge of 1640 grams of the filtered solution was placed in a two liter glass reaction flask equipped with a gas inlet, a reflux condenser and a stirrer. The stirrer comprised a rectangular plate having the dimensions 0.75 inch by 3 inches and was hinged in the slotted end of a one-half inch diameter steel shaft so that it could be inserted and removed through the neck of the flask. The plate formed a paddle type agitator 3 inches wide by 0.75 inch high. The solution was agitated by rotating the stirrer at a rate of 50 revolutions per minute was heated to a polymerization temperature of 80° C., during agitating, over a period of 48 hours, while in contact with an atmosphere of nitrogen. The prepolymerized solution was analyzed and found to contain 23.6 per cent by weight of polymer. A charge of 360 grams of the prepolymerized solution was sealed in a glass tube and the remaining monomers polymerized by heating the same in accordance with the following schedule of time and temperature conditions: 48 hours at 90° C.; 24 hours at 110° C.; and 24 hours at 150° C. The polymeric product was removed from the tube and crushed to a granular form. A weighed portion of the polymeric product was heated in vacuum to a temperature of 216° C. at 1 millimeter absolute pressure over a period of 30 minutes, then cooled and re-weighed. The loss in weight was 1.6 per cent. Correspondingly, 98.4 per cent by weight of the starting prepolymerized solution was obtained as a homogeneous polymeric product. The product was soluble in diethylbenzene. Moldings of the polymeric product were uniform and free of blemishes. By way of comparison, a charge of 360 grams of the filtered solution of the rubber in the monomeric styrene, when sealed in a glass tube and polymerized by heating the same in accordance with the same schedule of time and temperature conditions, i. e. 48 hours at 80° C., 48 hours at 90° C., 24 hours at 110° C., and 24 hours at 150° C., but without agitating, was found to be insoluble in diethylbenzene, although swollen thereby. Moldings of this polymeric product were non-uniform.

EXAMPLE 2

A solution consisting of 1900 grams of monomeric styrene and 100 grams of smoked natural rubber was prepared and polymerized by procedure similar to that described in Example 1. The prepolymerized solution contained 17.4 per cent by weight of polymer. The polymeric product obtained by agitating a portion of the solution during the prepolymerizing step and thereafter polymerizing the remaining monomers without agitating, by procedure described in Example 1, until 95.7 per cent by weight of the starting materials were polymerized was found to be soluble in diethylbenzene. In contrast, a polymeric product obtained by polymerizing a portion of the solution of smoked natural rubber in monomeric styrene under the same time and temperature conditions, but without agitating at any stage during polymerization, was insoluble in diethylbenzene.

EXAMPLE 3

In each of a series of experiments, a solution consisting of 1900 grams of monomeric ortho-chlorostyrene and 100 grams of a rubber as indicated in the following table, was prepared and polymerized by procedure similar to that described in Example 1. A charge of 1640 grams of each solution was prepolymerized by heating the same to a temperature of 80° C. over a period of 16 hours, while agitating the mixture by operating the stirrer at a rate of 180 revolutions per minute. Thereafter, a charge of 360 grams of the prepolymerized solution was sealed in a glass tube and the remaining monomers polymerized by heating the same in accordance with the following schedule of time and temperature conditions: 48 hours at 90° C.; 24 hours at 110° C.; and 24 hours at 150° C. The polymeric product from each experiment was tested for solubility in diethylbenzene. Table I identifies each polymeric product by stating the type and the proportion in parts by weight of the rubber and the ortho-chlorostyrene from which it was prepared. The table also gives the amount of polymer formed during agitating and in the polymeric product, expressed as per cent by weight of the starting solution and indicates the solubility of the polymeric product in diethylbenzene.

*Table I*

| Run No. | Polymerization Mixture | | Ortho-Chloro-Styrene, Pts. | Percent Polymer During Agitating | Products | |
|---|---|---|---|---|---|---|
| | Rubber | | | | Percent Polymeric Product | Solubility in Diethyl-benzene |
| | Type | Pts. | | | | |
| 1 | GRS X274 | 5 | 95 | 34.5 | 93.9 | Soluble. |
| 2 | Hycar OR-15 | 5 | 95 | 46.2 | 94.3 | Do. |
| 3 | Natural (smoked) | 5 | 95 | 34.5 | 93.1 | Do. |

Hycar OR-15 is a copolymer of about 85 per cent by weight of butadiene and 15 per cent of acrylonitrile. For comparison, a charge of 360 grams of each solution of rubber in monomeric ortho-chlorostyrene was polymerized under the same time and temperature conditions, but without agitating. The polymeric products obtained by polymerizing a portion of each solution of rubber in monomeric ortho-chlorostyrene under the same time and temperature conditions, but without agitating, were all insoluble in diethylbenzene.

EXAMPLE 4

In each of a series of experiments, 100 grams of a rubber as indicated in the following table, was added to a solvent mixture consisting of 1425 grams of styrene and 475 grams of methyl isopropenyl ketone and stirred at room temperature over a period of 16 hours to form a homogeneous solution. A charge of 1640 grams of each solution was prepolymerized by heating the same to a temperature of 80° C., during agitating, by procedure and using apparatus similar to those described in Example 1. Thereafter, a charge of 360 grams of each prepolymerized solution was sealed in a glass tube and the remaining monomers polymerized by heating the same in accordance with the schedule of time and temperature conditions stated in the table. Table II identifies each polymeric product by stating the type and the proportion in per cent by weight of the rubber, in the solution from which it was prepared. The table gives the prepolymerization time in hours, the speed of the stirrer in revolutions per minute and the per cent of polymer formed during agitating, expressed as per cent by weight of the starting solution. The table also gives the schedule of time and temperature conditions employed to polymerize the remaining monomers in the prepolymerized solution, the per cent polymerization or yield of polymeric product based on the starting solution, and indicates the solubility of the polymeric products in diethylbenzene.

ture conditions but without agitating at any stage during polymerization. The polymeric product was insoluble in diethylbenzene.

EXAMPLE 7

A mixture consisting of 9641 pounds of monomeric styrene, 103.5 pounds of butyl stearate, 103.5 pounds of soybean oil and 517 pounds of unvulcanized GRS type X–274 synthetic rubber was stirred at room temperature over a period of 48 hours. The resulting solution was filtered to remove insoluble substances. Approximately one pound of insoluble material was separated. A charge of 700 pounds of the filtered solution was fed into a jacketed vessel six feet high having an internal Table II

| No. | Rubber | | Prepolymerization Conditions | | | Finishing Polymerization Conditions | Polymeric Products | |
|---|---|---|---|---|---|---|---|---|
| | Type | Percent | Time, Hrs. | Stirrer, R. P. M. | Percent Polymer | | Percent | Solubility in Diethylbenzene |
| 1 | GRS X274 | 5 | 72 | 50 | 27.2 | 72 hrs. at 90° C., 24 hrs. at 110° C., 24 hrs. at 150° C. | 87.3 | Soluble. |
| 2 | Simplex [1] | 5 | 48 | 50 | 37.9 | 48 hrs. at 90° C., 24 hrs. at 110° C., 24 hrs. at 150° C. | 91.5 | Do. |
| 3 | Hycar OR-15 | 5 | 275 | 180 | 30.4 | ----do---- | 77.2 | Do. |
| 4 | Natural (smoked) | 5 | 72 | 180 | 16.2 | ----do---- | 83.4 | Do. |

[1] Simplex is a deproteinized natural rubber.

For comparison, a charge of 360 grams of each solution of rubber in the monomeric starting materials was polymerized under the same time and temperature conditions, but without agitating. The products thus obtained were all insoluble in diethylbenzene.

EXAMPLE 5

A mixture consisting of 100 grams of GRS X–274 synthetic rubber, 1425 grams of styrene and 475 grams of acrylonitrile was stirred at room temperature over a period of 16 hours. A charge of 1640 grams of the resulting solution was prepolymerized during agitating over a period of 24 hours by procedure and with apparatus similar to those described in Example 1. The prepolymerized solution contained 29.4 per cent by weight of polymer. A charge of 360 grams of the prepolymerized solution was sealed in a glass tube and the remaining monomers polymerized by heating the same in accordance with the following time and temperature conditions: 48 hours at 90° C.; 24 hours at 110° C.; and 24 hours at 150° C. The yield of polymeric product was 98.9 per cent, based on the weight of the starting material. The product was soluble in acetone. In contrast, a similar charge of the solution of rubber in the mixture of monomers, when polymerized under the same time and temperature conditions, but without agitating, is found to be insoluble in acetone.

EXAMPLE 6

A solution consisting of 1900 grams of monomeric styrene and 100 grams of a freshly prepared homopolymer of butadiene, obtained by sealing equal parts by weight of monomeric butadiene-1,3 and benzene in a glass tube and heating the same to a temperature of 80° C. over a period of 21 days and thereafter precipitating the polymer by pouring the benzene solution into an excess of methyl alcohol, was placed in the reaction flask described in Example 1. The solution was agitated by rotating the stirrer at a rate of 180 revolutions per minute and was heated to a temperature of 80° C. over a period of 48 hours. Thereafter, the solution was analyzed and found to contain 18.9 per cent by weight of polymer. A charge of 360 grams of the prepolymerized solution was sealed in a glass tube and heated in accordance with the following time and temperature conditions: 48 hours at 90° C.; 24 hours at 110° C.; and 24 hours at 150° C.; without agitating, to polymerize the remaining monomers. The polymeric product was removed from the tube and crushed to a granular form. The polymerization was 94.6 per cent complete. The polymeric product was soluble in diethylbenzene. Flow moldings of the product were uniform and free of blemishes. In contrast, a solution consisting of 18 grams of the polybutadiene described above and 342 grams of monomeric styrene was polymerized in mass under the same time and temperadiameter of three feet and equipped with a tubular agitator having a hollow shaft. The agitator comprised a bank of vertical steel tubes having a diameter of one inch. The tubes were disposed on a horizontal plane at a distance of 2.75 inches between centers. The ends of the tubes were connected to headers attached to the hollow shaft to form a slotted tubular paddle type agitator having overall dimensions corresponding to a rectangle 2.5 feet wide by 4.5 feet high. The shaft of the agitator was provided with a suitable inlet and outlet for passage of heating or cooling liquid through the tubular paddle, as required. The vessel was filled to about one-half its capacity, with the solution of rubber in monomeric styrene. The solution was stirred by rotating the agitator at a rate of 28 revolutions per minute and was heated and maintained at a temperature of 83° C., over a prepolymerizing period of about 46 hours. The solution then contained about 35 per cent by weight of polymer. Thereafter, the remaining filtered solution of the rubber in the monomeric styrene was fed in continuous manner, at a rate corresponding to 15 pounds of the solution per hour, into the vessel wherein it was mixed with the polymerizing solution and was heated to a polymerization temperature of 83° C., during agitating, over a polymerization time of about 46 hours, while at the same time the polymerizing solution was being withdrawn from the vessel at a rate corresponding to about the rate of feed of said vessel. By polymerization time is meant the time required for an infinitesimal portion of the feed solution to traverse the bed of the polymerizing solution. The prepolymerized or partially polymerized solution, withdrawn from the vessel, contained 34.8 per cent by weight of polymer. It was sealed in closed containers, each containing approximately 90 pounds of the solution and was heated in bulk, without further agitating, in accordance with the following schedule of time and temperature conditions: 172 hours at 67° C.; 120 hours at 72° C.; 8 hours at 85° C.; and 72 hours at 150° C.; to polymerize the remaining monomer. The polymeric product was removed from the containers and was crushed to a granular form. A portion of the product was injection molded to form test bars of ⅛ by ⅛ inch square cross section. These test bars were used to determine the tensile strength in pounds per square inch of initial cross section, the per cent of its original length by which the product could be elongated and the impact strength in inch-pounds of energy applied as a sharp blow to cause breakage of a test bar. Except for the shape and dimensions of the test bars and the weight of the hammer used in measuring impact strength, the procedures for determining the tensile strength and per cent elongation values were similar to those described in A. S. T. M. D638–44T and the procedure followed in measuring impact strength was similar to that described in A. S. T. M. D256–43T. Other molded test pieces were used to determine the heat distortion temperature by a procedure of Heirholzer and Boyer A. S. T. M. Bulletin No. 134 of May, 1945. Other portions of the polymeric product were tested to determine the proportion of volatile material therein and a viscosity characteristic of the polymer. The procedure in determining the proportion of volatile material was to weigh a portion of the polymeric product, then heat it under vacuum at 216° C. and at 1 millimeter absolute pressure for 30 minutes and cool and reweigh. The loss in weight represents volatile ingredients. The viscosity characteristic was determined by dissolving a portion of the polymeric product in toluene to form a solution containing 10 per cent by weight of said polymer and determining the absolute viscosity in centipoises at 25° C. of the solution. Other portions of the polymeric product were compression molded to form a flat plate approximately 0.020 inch thick, which moldings were examined for blemishes or inhomogeneities in the polymeric product. The polymeric product was soluble in toluene. Compression moldings of the polymer were free of blemishes or "fish eyes." Other properties of the polymeric product were:

| | |
|---|---|
| Tensile strength | 5010 lbs./sq. in. |
| Impact | 4.15 in.-lbs. |
| Elongation | 24.9 per cent. |
| Heat distortion temperature | 78° C. |
| Volatile | 1.45 per cent. |
| Viscosity at 25° C | 174 centipoises. |

A solution consisting of 5 per cent by weight of GRS type X–274 synthetic rubber, together with one per cent of butyl stearate, one per cent of soybean oil and 93 per cent of monomeric styrene, when sealed in a closed container, together with 0.03 per cent by weight of benzoyl peroxide as polymerization catalyst and polymerized in bulk, without agitating, in accordance with the following schedule of time and temperature conditions: 240 hours at 55° C.; 24 hours at 85° C. and 120 hours at 150° C.; is found to form a polymeric product which is swollen by, but is insoluble in toluene. Compression moldings of the polymer are found to be non-uniform and contain blemishes, or "fish eyes," resulting from the formation of insoluble polymer gels by cross-linking of the polymer molecules during the polymerization reaction.

EXAMPLE 8

By procedure similar to that described in Example 7, a solution consisting of 88 parts by weight of monomeric styrene, 1 part of soybean oil, 1 part of butyl stearate and 10 parts of unvulcanized GRS type X–274 synthetic rubber was prepolymerized by heating the same to a temperature of 75° C. during agitating, to form a prepolymerized solution containing 32.2 per cent by weight of polymer. This solution was withdrawn from the prepolymerizing vessel and was fed in continuous manner, at a rate corresponding to 10 pounds of the solution per hour, into the heated barrel of a plastics extruder 16 feet long and having an internal diameter of 10 inches. The barrel of the extruder was jacketed in four equal sections, through each of which, heating or cooling liquid could be passed, as required, and was equipped with a compression type screw adapted for forwarding the polymerizing solution through the barrel of the extruder and discharge of the polymeric product through an extrusion die or orifice. The screw rotated at a rate of 36 revolutions per hour. The prepolymerized solution was advanced by action of the screw through a series of polymerization zones heated to temperatures of 90° C., 110° C., 130° C., and 155° C., respectively, and was discharged through an extrusion die into the atmosphere. The polymerization time was approximately 24 hours. By polymerization time is meant the time required for an infinitesimal portion of the prepolymerized solution to traverse the plastics extruder from the point of feed thereto to the point of discharge. The polymeric product was cooled as it was discharged from the extruder and ground to a granular form. The product was soluble in toluene. Compression moldings made from the polymer were homogeneous and were free of blemishes or "fish eyes." Other properties of the polymer were:

| | |
|---|---|
| Impact strength | 3 in.-lbs. |
| Elongation | 33 per cent. |
| Volatile | 1.7 per cent. |
| Viscosity at 25° C | 32 centipoises. |

EXAMPLE 9

A solution consisting of 93 per cent by weight of styrene, 1 per cent of soybean oil, 1 per cent of butyl stearate, and 5 per cent of Perbunan N. S. 18 synthetic rubber (a copolymer containing in chemically combined form 18 per cent by weight of acrylonitrile and 82 per cent of butadiene) was prepared by procedure similar to that described in Example 7, and was fed at a rate corresponding to 27 pounds of the solution per hour into the prepolymerizing vessel wherein it was agitated and heated to a polymerization temperature of 87° C. over a period of about 26 hours. The polymerizing mass was withdrawn from the vessel at a rate corresponding to the rate of feed thereto, as a solution containing 35.4 per cent by weight of polymeric product. The prepolymerized solution was fed into the plastics polymerizer and extruder described in Example 8, wherein it was heated to temperatures of 137° C., 138° C., 163° C., and 199° C., as it was advanced through the successive polymerization zones of the extruder by means of the screw operating at a rate of 60 revolutions per minute. The product was discharged through an extrusion orifice into the atmosphere. The polymeric product was cooled and ground to a granular form. It was soluble in toluene. Flow moldings of the polymeric product were uniform and were free of blemishes. Other properties of the polymeric product were determined as described in Example 1 and were found to be:

| | |
|---|---|
| Tensile strength | 5920 lbs./sq. in. |
| Impact strength | 4.8 in.-lbs. |
| Elongation | 5.4 per cent. |
| Heat distortion temperature | 69° C. |

Other modes of applying the principle of the invention may be employed instead of those explained, change being made with regard to the step or steps herein employed, provided the step or steps stated in any of the following claims or the equivalent of such step or steps be employed.

We claim:

1. A method for making a substantially linear interpolymer of a monovinyl aromatic compound and a rubber, which method comprises polymerizing a homogeneous liquid mixture of copolymerizable mono-olefinic compounds containing as the sole polymerizable components at least 63.75 per cent by weight of a monomeric polymerizable monovinyl aromatic compound selected from the group consisting of monovinyl aromatic hydrocarbons and nuclear halogenated derivatives thereof, not more than 21.25 per cent of a monomeric vinylidene compound which is a member of the group consisting of acrylonitrile, methyl isopropenyl ketone and monoalkenyl aromatic hydrocarbons of the benzene series and nuclear chlorinated derivatives thereof, and from 1 to 15 per cent by weight of an unvulcanized rubber which is soluble in monomeric styrene and is selected from the group consisting of natural rubber, synthetic GR–S type rubber containing in chemically combined form from 50 to 80 per cent by weight of butadiene and from 20 to 50 per cent of styrene, synthetic Buna N type rubber containing in chemically combined form from 75 to 85 per cent by weight of butadiene and from 15 to 25 per cent of acrylonitrile, a copolymer containing in chemically combined form 50 per cent by weight of butadiene and 50 per cent of methyl isopropenyl ketone, and polybutadiene rubber, the said liquid mixture being substantially free from insoluble gels, by heating the liquid mixture of copolymerizable components at a polymerization temperature between 60° and 200° C. such that the reacting mass is kept in a flowable condition as the monomer is progressively polymerized while at the same time subjecting the reacting mass to a shearing agitation sufficient to prevent appreciable cross-linking of the polymer being formed with resultant formation of a linear interpolymer until at least 10 per cent by weight of the monomeric polymerizable starting materials have been polymerized.

2. A method as claimed in claim 1, wherein the reacting mass is subjected to a shearing agitation throughout its mass until substantially all of the monomeric starting materials have been polymerized.

3. A method for making a substantially linear interpolymer of a monovinyl aromatic compound and a rubber, which method comprises polymerizing a homogeneous liquid mixture of copolymerizable mono-olefinic compounds containing as the sole polymerizable components at least 63.75 per cent by weight of a monomeric polymerizable monovinyl aromatic compound selected from the group consisting of monovinyl aromatic hydrocarbons and nuclear halogenated derivatives thereof, not more than 21.25 per cent of alpha-methylstyrene and from 1 to 15 per cent by weight of an unvulcanized rubber which is soluble in monomeric styrene and is selected from the group consisting of natural rubber, synthetic GR–S type rubber containing in chemically combined form from 50 to 80 per cent by weight of butadiene and from 20 to 50 per cent of styrene, synthetic Buna N type rubber containing in chemically combined form from 75 to 85 per cent by weight of butadiene and from 15 to 25 per cent of acrylonitrile, a copolymer containing in chemically combined form 50 per cent by weight of butadiene and 50 per cent of methyl isopropenyl ketone, and polybutadiene rubber, the said liquid mixture being substantially free from insoluble gels, by heating the liquid mixture of copolymerizable components at a polymerization temperature between 60° and 150° C. such that the reacting mass is kept in a flowable condition as the monomer is progressively polymerized while at the same time subjecting the reacting mass to a shearing agitation sufficient to prevent appreciable cross-linking of the polymer being formed with resultant formation of a linear interpolymer until from 10 to 40 per cent by weight of the monomeric starting materials have been polymerized, then discontinuing the agitation and continuing heating of the mass at temperatures between 60° and 200° C. to substantially polymerize the remaining monomer.

4. A method for making a substantially linear interpolymer of styrene and a rubber, which method comprises polymerizing a solution consisting of from 90 to 95 per cent by weight of monomeric styrene and from 5 to 10 per cent of a synthetic GR–S type rubber containing in chemically combined form from 50 to 80 per cent by weight of butadiene and from 20 to 50 per cent of styrene, the said solution being substantially free from insoluble gels, by heating the solution at a polymerization temperature between 60° and 200° C., such that the reacting mass is kept in a flowable condition as the monomer is progressively polymerized while at the same time subjecting the reacting mass to a shearing agitation sufficient to prevent appreciable cross-linking of the polymer being formed with resultant formation of a linear interpolymer until substantially all of the monomeric styrene is polymerized.

5. A method for making a substantially linear interpolymer of styrene and a rubber, which method comprises polymerizing a solution consisting of from 90 to 95 per cent by weight of monomeric styrene and from 5 to 10 per cent of an unvulcanized synthetic GR–S type rubber containing in chemically combined form from 50 to 80 per cent by weight of butadiene and from 20 to 50 per cent of styrene, the said solution being substantially free from insoluble gels, by heating the solution at a polymerization temperature between 70° and 90° C. such that the reacting mass is kept in a flowable condition as the monomer is progressively polymerized while at the same time subjecting the reacting mass to a shearing agitation sufficient to prevent appreciable cross-linking of the polymer being formed with resultant formation of a linear interpolymer until from 10 to 40 per cent by weight of the monomeric starting materials have been polymerized, then discontinuing the agitation and continuing heating of the mass at temperatures between 90° and 200° C. to substantially polymerize the remaining monomeric styrene.

6. A method for making a substantially linear interpolymer of a monovinyl aromatic compound and a rubber, which method comprises polymerizing a homogeneous liquid mixture of copolymerizable mono-olefinic compounds containing as the sole polymerizable components at least 63.75 per cent by weight of a monomeric polymerizable monovinyl aromatic compound selected from the group consisting of monovinyl aromatic hydrocarbons and nuclear halogenated derivatives thereof, not more than 21.25 per cent of alpha-methylstyrene and from 1 to 15 per cent by weight of an unvulcanized rubber which is soluble in monomeric styrene and is selected from the group consisting of natural rubber, synthetic GR–S type rubber containing in chemically combined form from 50 to 80 per cent by weight of butadiene and from 20 to 50 per cent of styrene, synthetic Buna N type rubber containing in chemically combined form from 75 to 85 per cent by weight of butadiene and from 25 to 15 per cent of acrylonitrile, a copolymer containing in chemically combined form 50 per cent by weight of butadiene and 50 per cent of methyl isopropenyl ketone and polybutadiene rubber, the said liquid mixture being substantially free from insoluble gels, by heating the liquid mixture of copolymerizable components at a polymerization temperature between 60° and 200° C. such that the reacting mass is kept in a flowable condition as the monomer is progressively polymerized while at the same time subjecting the reacting mass to a shearing agitation sufficient to prevent appreciable cross-linking of the polymer being formed with resultant formation of a linear interpolymer until substantially all of the monomeric starting materials have been polymerized.

References Cited in the file of this patent

UNITED STATES PATENTS

| Number | Name | Date |
|---|---|---|
| 1,613,673 | Ostromislensky | Jan. 11, 1927 |
| 2,356,091 | Roedel | Aug. 15, 1944 |
| 2,382,498 | Morley | Aug. 14, 1945 |
| 2,406,403 | Rogers | Aug. 27, 1946 |
| 2,460,300 | Le Fevre et al. | Feb. 1, 1949 |
| 2,576,134 | Morley | Nov. 27, 1951 |

FOREIGN PATENTS

| Number | Country | Date |
|---|---|---|
| 593,072 | Great Britain | Oct. 8, 1947 |